US012749999B2

(12) United States Patent
Yang

(10) Patent No.: US 12,749,999 B2
(45) Date of Patent: Sep. 29, 2026

(54) OIL TEMPERATURE CONTROL DEVICE AND METHOD

(71) Applicant: HYUNDAI MOBIS CO., LTD., Seoul (KR)

(72) Inventor: Hae Jun Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 239 days.

(21) Appl. No.: 18/643,054

(22) Filed: Apr. 23, 2024

(65) Prior Publication Data

US 2025/0080032 A1 Mar. 6, 2025

(30) Foreign Application Priority Data

Aug. 31, 2023 (KR) ........................ 10-2023-0115707

(51) Int. Cl.

*G05B 5/00* (2006.01)
*B60K 11/02* (2006.01)
*F16N 29/02* (2006.01)
*H02P 29/64* (2016.01)

(52) U.S. Cl.

CPC .............. *H02P 29/64* (2016.02); *B60K 11/02* (2013.01); *F16N 29/02* (2013.01); *F16N 2210/04* (2013.01); *F16N 2210/18* (2013.01); *F16N 2250/08* (2013.01); *F16N 2270/56* (2013.01); *F16N 2270/70* (2013.01)

(58) Field of Classification Search

CPC .......... H02P 29/60; H02P 29/66; H02P 29/64; H02P 29/68; H02P 29/62

See application file for complete search history.

(56) References Cited

U.S. PATENT DOCUMENTS 9,352,656 B2 * 5/2016 Rao ........................ H02K 11/25

FOREIGN PATENT DOCUMENTS

JP 6378098 B2 * 8/2018
KR 101000431 B1 * 12/2010 ............ B60W 10/30
KR 101807517 B1 * 12/2017 .............. F04B 49/02

* cited by examiner

*Primary Examiner* — Karen Masih
(74) *Attorney, Agent, or Firm* — Morgan, Lewis & Bockius LLP

(57) ABSTRACT

The present disclosure relates to oil temperature control device and method of a vehicle including a motor, and more particularly, to oil temperature control device and method for estimating and controlling an oil temperature by using a back electromotive force of a motor.

11 Claims, 3 Drawing Sheets

[FIG. 1]
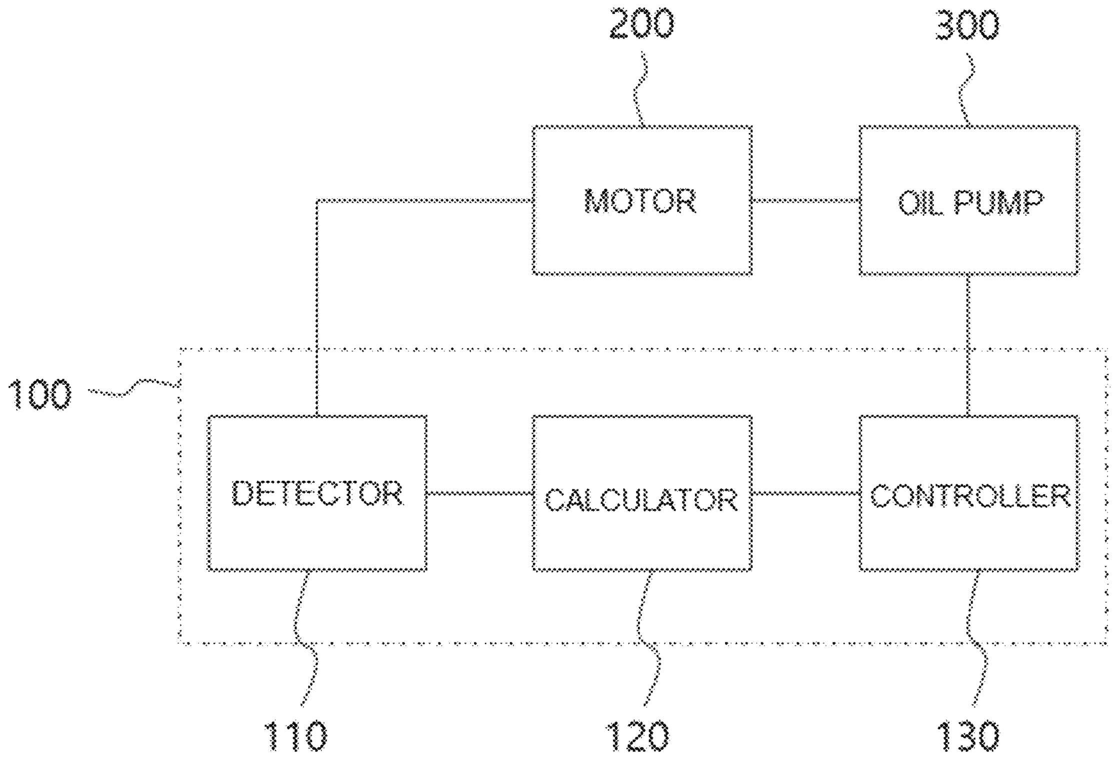

[FIG. 2]
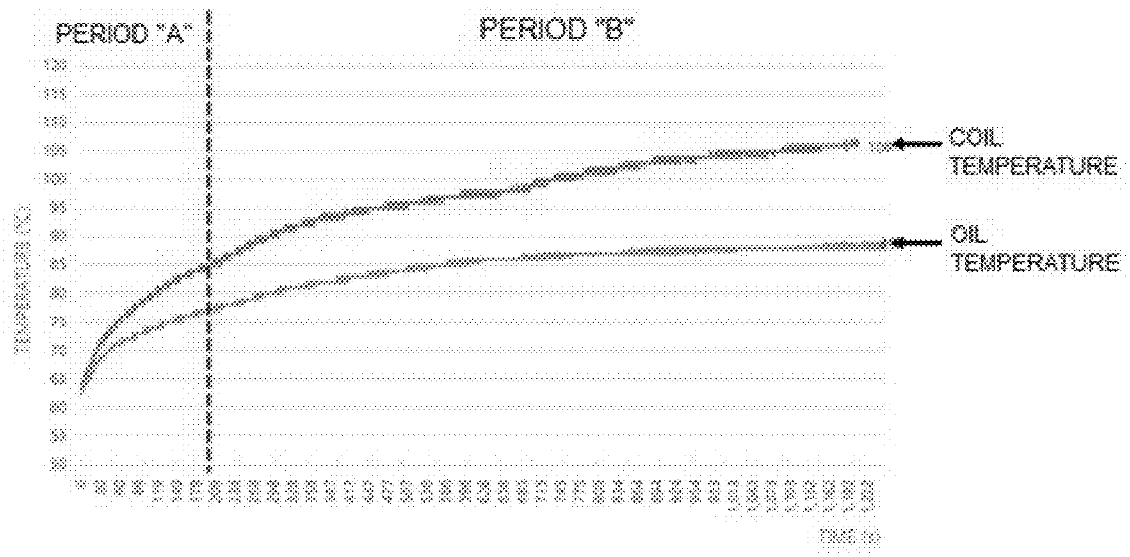

[FIG. 3]
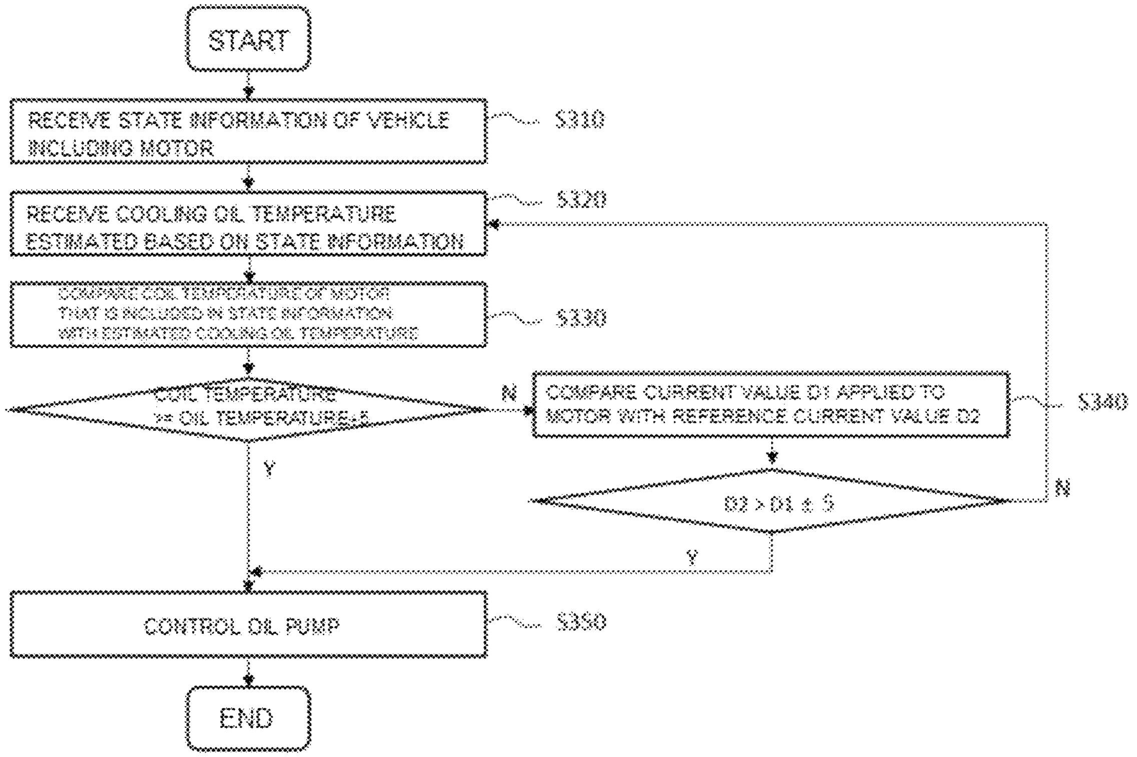

OIL TEMPERATURE CONTROL DEVICE AND METHOD

CROSS-REFERENCE TO RELATED APPLICATIONS

This application claims priority under 35 U.S.C. § 119 to Korean Patent Application No. 10-2023-0115707, filed on Aug. 31, 2023, in the Korean Intellectual Property Office, the disclosure of which is incorporated herein by reference in its entirety.

TECHNICAL FIELD

The following disclosure relates to oil temperature control device and method of a vehicle including a motor, and more particularly, to oil temperature control device and method for estimating and controlling an oil temperature by using a back electromotive force of a motor.

BACKGROUND

In recent years, due to a serious environmental problem caused by the use of fossil fuels such as gasoline and diesel as well as depletion of limited resources, an eco-friendly vehicle such as an electric vehicle, a fuel cell vehicle, and a hybrid vehicle, driven by a motor, has been developed and operated. In accordance with the development and commercialization of the electric vehicle, many vehicles each including the motor are being produced. In such a vehicle including the motor, most devices including the battery may be electrically connected to each other, and heat control may thus be important.

In particular, the motor is a device directly driving the electric vehicle or the like, and it is thus important to manage its heat generation, aging, and the like. A current electric vehicle driving system may include a sensor measuring a coil temperature of the motor and a sensor measuring an oil temperature to determine a motor state to thus measure two temperatures and determine whether an abnormality occurs. However, although the oil temperature is changed based on a vehicle driving condition, the oil temperature may have a small change. Accordingly, providing such a separate sensor measuring the temperature may have low efficiency.

On the other hand, the back electromotive force of the motor may appear inversely proportional to the temperature, and the changes in the temperature and the back electromotive force may appear linearly after a predetermined period. Therefore, the oil temperature may be estimated by using the back electromotive force, and as mentioned above, it is possible to determine whether the abnormality occurs by estimating the oil temperature even without any separate sensor measuring the oil temperature.

SUMMARY

An embodiment of the present disclosure is directed to estimating an oil temperature through a back electromotive force applied to a motor, determining whether an abnormality occurs based thereon, and controlling an oil pump for performing cooling based on the presence or absence of the abnormality.

In one general aspect, provided is an oil temperature control device including: a detector detecting state information of a vehicle including a motor; a calculator estimating a cooling oil temperature of the motor based on the state information; and a controller controlling an oil pump by comparing a coil temperature of the motor that is included in the state information with the cooling oil temperature estimated by the calculator, wherein the controller controls a rotation speed of the oil pump based on a difference between the coil temperature and the cooling oil temperature.

The calculator may calculate a back electromotive force of the motor based on vehicle speed information included in the state information, and estimate the cooling oil temperature based on the back electromotive force.

Wherein the calculator may estimate an initial cooling oil temperature in a period from a stop state of the vehicle to its idle state based on the back electromotive force, and estimate a driving cooling oil temperature in a driving state period of the vehicle.

The controller may compare the coil temperature with the cooling oil temperature when a difference between the initial cooling oil temperature and the driving cooling oil temperature reaches a predetermined value.

The controller may compare the coil temperature with the cooling oil temperature when the driving cooling oil temperature reaches a predetermined temperature.

The controller may control the oil pump by comparing the coil temperature with the cooling oil temperature in a period in which the coil temperature and the cooling oil temperature are linearly increased.

The controller may control the oil pump based on a current value applied to the motor that is measured by the detector when the cooling oil temperature is less than a predetermined reference.

The controller may compare the current value applied to the motor that is measured by the detector with a pre-stored reference current value, and control the oil pump when a difference between the current value applied to the motor and the reference current value is more than a predetermined reference value.

In another general aspect, provided is a cooling oil temperature control method of a vehicle including a motor, the method including: (a) receiving, by a controller, state information of the vehicle including the motor; (b) receiving, by the controller, a cooling oil temperature estimated based on the state information; and (c) controlling, by the controller, an oil pump by comparing a coil temperature of the motor that is included in the state information with the estimated cooling oil temperature, wherein in the operation (c), a rotation speed of the oil pump is controlled when a difference between the coil temperature and the cooling oil temperature is more than a predetermined value.

In the operation (c), the oil pump may be controlled by the controller based on a current value applied to the motor that is included in the state information when the cooling oil temperature is less than a predetermined reference.

The operation (c) may include (c-1) comparing the current value applied to the motor that is included in the state information with a pre-stored reference current value, and (c-2) controlling the oil pump when a difference between the current value applied to the motor and the reference current value is more than a predetermined reference value.

BRIEF DESCRIPTION OF THE DRAWINGS

FIG. 1 is a configuration diagram showing an oil temperature control system of a vehicle including a motor according to an embodiment of the present disclosure.

FIG. 2 is a graph showing changes in a coil temperature and an oil temperature measured according to an embodiment of the present disclosure.

FIG. 3 is a flowchart showing an oil temperature control method of a vehicle including a motor according to another embodiment of the present disclosure.

DETAILED DESCRIPTION OF EMBODIMENTS

The above-mentioned objects, features, and advantages will become more obvious from the following embodiments provided in relation to the accompanying drawings. The following descriptions of specific structures and functions are provided only to describe the embodiments based on a concept of the present disclosure. Therefore, the embodiments of present disclosure may be implemented in various forms, and the present disclosure is not limited thereto. The embodiments of the present disclosure may be variously modified and may have several forms, and specific embodiments are thus shown in the accompanying drawings and described in detail in the specification or the present application. However, it is to be understood that the present disclosure is not limited to the specific embodiments, and includes all modifications, equivalents, and substitutions, included in the spirit and scope of the present disclosure. Terms such as "first", "second", or the like may be used to describe various components, and the components are not to be construed as being limited to the terms. The terms are used only to distinguish one component from another component. For example, a "first" component may be named a "second" component and the "second" component may also be named the "first" component, without departing from the scope of the present disclosure. It is to be understood that when one component is referred to as being "connected to" or "coupled to" another component, the corresponding component may be connected or coupled directly to another component or connected or coupled to another component with a third component interposed therebetween. On the other hand, it is to be understood that when one component is referred to as being "connected directly to" or "coupled directly to" another component, it may be connected to or coupled to another component without the third component interposed therebetween. Other expressions to describe a relationship between the components, i.e., "~between" and "directly between" or "adjacent to" and "directly adjacent to", should be interpreted in the same manner as above. Terms used in the specification are used to describe the specific embodiments, and are not intended to limit the present disclosure. A term of a singular number may include its plural number unless explicitly indicated otherwise in the context. It is to be understood that a term "include," "have," or the like used in the specification specifies the existence of features, numerals, steps, operations, components, parts or combinations thereof, and does not preclude the existence or addition of one or more other features, numerals, steps, operations, components, parts or combinations thereof. Unless otherwise defined, all terms including technical and scientific terms used herein have the same meanings as those commonly understood by those skilled in the art to which the present disclosure pertains. It is to be further understood that terms such as those defined in commonly used dictionaries should be interpreted as having meanings consistent with their meanings in the context of the relevant art and are not to be interpreted in an idealized or overly formal sense unless expressly so defined herein. Hereinafter, the embodiments of the present disclosure are described in detail with reference to the accompanying drawings. Like reference numerals denote like components throughout the drawings.

FIG. 1 is a configuration diagram showing an oil temperature control system of a vehicle including a motor according to an embodiment of the present disclosure.

Referring to FIG. 1, the oil temperature control system of the vehicle including a motor 200 may include an oil temperature control device 100, the motor 200, and an oil pump 300. In addition, the oil temperature control device 100 may include a detector 110, a calculator 120, and a controller 130.

The detector 110 may detect state information of the vehicle including the motor 200. The vehicle including the motor 200 may include, for example, an electric vehicle, an electric scooter, or an electric kickboard. The state information detected by the detector 110 may include a coil temperature of the motor, vehicle speed information, a current value applied to the motor, or the like. The detector 110 may include a temperature sensor, a speed sensor, an ammeter, or the like to detect the state information.

The calculator 120 may estimate a cooling oil temperature of the motor 200 based on the state information detected by the detector 110. The calculator 120 may calculate a back electromotive force of the motor 200 based on the vehicle speed information included in the state information, and estimate the cooling oil temperature based on the back electromotive force. The back electromotive force applied to the motor may be proportional to a magnetic flux of a permanent magnet. As the oil temperature is increased during vehicle driving, a permanent magnet temperature may also be simultaneously increased, thus reducing the back electromotive force. Here, the oil temperature and the back electromotive force may be linearly inversely proportional to each other, and the oil temperature corresponding to a specific back electromotive force value may be estimated by extracting data.

In addition, the calculator 120 may estimate an initial cooling oil temperature corresponding to a period from a stop state of the vehicle to its idle state, and estimate a driving cooling oil temperature in a driving state period of the vehicle, based on the calculated back electromotive force. The period from the stop state of the vehicle to its idle state may be a period in which the temperature is rapidly increased, and the driving state period of the vehicle may be a period in which the temperature is linearly and consistently increased. The calculator 120 may only estimate the oil temperature corresponding to the driving state period of the vehicle to ensure data reliability.

The controller 130 may control the oil pump 300 by comparing a coil temperature of the motor 200 that is included in the state information detected by the detector 110 with the cooling oil temperature estimated by the calculator 120. The controller 130 may control a rotation speed of the oil pump 300 based on a difference between the coil temperature and cooling oil temperature of the motor 200. For example, when the difference between the coil temperature and the oil temperature is 5° C. or less, or when the oil temperature is more than the coil temperature, the controller 130 may determine that the oil temperature is abnormally high and may cool the oil pump 300 by increasing its rotation speed. In addition, the controller 130 may compare the coil temperature with the cooling oil temperature in a period in which the coil temperature and the cooling oil temperature are linearly increased to ensure the reliability. For example, the controller 130 may compare the coil temperature with the cooling oil temperature from a period of 70° C. or more, which is the period in which the cooling oil temperature is linearly increased.

In addition, the controller 130 may compare the initial cooling oil temperature with the driving cooling oil temperature estimated by the calculator 120 to determine the period in which the coil temperature and the cooling oil temperature are linearly increased. The controller 130 may compare the coil temperature with the cooling oil temperature when a difference between the initial cooling oil temperature and the driving cooling oil temperature reaches a predetermined value. For example, the controller 130 may compare the coil temperature with the cooling oil temperature when the difference between the initial cooling oil temperature and the driving cooling oil temperature is 40° C. or more. Here, the controller 130 sets, as a reference, a case where the difference between the initial cooling oil temperature and the driving cooling oil temperature is 40° C. or more because this difference may be a reference for determining whether the cooling oil temperature reaches 70° C. or more, i.e., the period in which the cooling oil temperature is linearly increased. The controller 130 may set any of various reference values as long as the corresponding value is the reference for determining the period in which the cooling oil temperature is linearly increased.

In addition, the controller 130 may control the oil pump 300 based on the current value applied to the motor 200 that is measured by the detector 110 when the cooling oil temperature is less than a predetermined reference. The controller 130 may control the rotation speed of the oil pump 300 by comparing the current value applied to the motor 200 with a pre-stored reference current value when the cooling oil temperature is less than the coil temperature and there is a difference of 5° C. or more. The controller 130 may pre-store the current value applied to the motor 200 when the coil temperature and cooling oil temperature of the motor 200 are normal and set the same as the reference current value. The controller 130 may determine that the coil temperature is abnormally high and control the rotation speed of the oil pump 300 when a difference between the current value applied to the motor 200 that is measured by the detector 110 and the pre-stored reference current value is more than the predetermined reference value.

FIG. 2 is a graph showing the changes in the coil temperature and the oil temperature measured according to an embodiment of the present disclosure.

Referring to FIG. 2, the coil temperature and cooling oil temperature of the motor 200 in the vehicle including the motor 200 may be gradually increased based on the driving state.

First, a period "A" may be the period corresponding to the stop state of the vehicle including the motor 200 to its idle state. In the period "A", the coil temperature and the oil temperature may be rapidly and non-linearly increased. Therefore, an oil temperature value estimated in the corresponding period may have poor reliability. However, the controller 130 may compare a temperature measured in the period "A" with a temperature measured in a period "B" to determine the period in which the oil temperature and the coil temperature are linearly increased.

The period "B" may be a period in which the vehicle including the motor 200 is in the driving state and the coil temperature and the cooling oil temperature are linearly increased. In the period "B", the calculator 120 may more accurately estimate the cooling oil temperature by using the back electromotive force applied to the motor 200. In the period "B", the controller 130 may compare the cooling oil temperature estimated by the calculator 120 with the coil temperature measured by the detector 110 to thus control the oil pump 300.

FIG. 3 is a flowchart showing an oil temperature control method of a vehicle including a motor according to another embodiment of the present disclosure.

Referring to FIG. 3, the oil temperature control method of a vehicle including a motor 200 according to the present disclosure may include: receiving, by a controller 130, state information of the vehicle including the motor 200 (S310); receiving, by the controller 130, a cooling oil temperature estimated based on the state information (S320); comparing, by the controller 130, a coil temperature of the motor 200 that is included in the state information with the estimated cooling oil temperature (S330); comparing, by the controller 130, a current value D1 applied to the motor with a reference current value (D2) (S340); and controlling, by the controller 130, an oil pump 300 (S350).

In operation S310, the controller 130 may receive the state information of the vehicle including the motor 200 from a detector 110. The state information detected by the detector 110 may include the coil temperature of the motor 200, vehicle speed information, a current value applied to the motor 200, or the like. The detector 110 may include a temperature sensor, a speed sensor, an ammeter, or the like to detect the state information.

In operation S320, the controller 130 may receive, from the calculator 120, the cooling oil temperature estimated based on the state information. The calculator 120 may estimate the cooling oil temperature of the motor 200 based on the state information detected by the detector 110. The calculator 120 may calculate a back electromotive force of the motor 200 based on the vehicle speed information included in the state information, and estimate the cooling oil temperature based on the back electromotive force. The back electromotive force applied to the motor may be proportional to a magnetic flux of a permanent magnet. As the oil temperature is increased during vehicle driving, a permanent magnet temperature may also be simultaneously increased, thus reducing the back electromotive force. Here, the oil temperature and the back electromotive force may be linearly inversely proportional to each other, and the oil temperature corresponding to a specific back electromotive force value may be estimated by extracting data.

In addition, the calculator 120 may estimate an initial cooling oil temperature corresponding to a period from a stop state of the vehicle to its idle state, and estimate a driving cooling oil temperature in a driving state period of the vehicle, based on the calculated back electromotive force. The period from the stop state of the vehicle to its idle state may be a period in which the temperature is rapidly increased, and the driving state period of the vehicle may be a period in which the temperature is linearly and consistently increased. The calculator 120 may only estimate the oil temperature corresponding to the driving state period of the vehicle to ensure data reliability.

In operation S330, the controller 130 may compare the coil temperature of the motor 200 that is included in the state information with the cooling oil temperature estimated by the calculator 120. The controller 130 may determine that the oil temperature is abnormally high and perform operation S350 when a difference between the coil temperature and the oil temperature is 5° C. or less, or the oil temperature is more than the coil temperature. In addition, the controller 130 may perform operation S340 when the cooling oil temperature is less than the coil temperature and there is a difference of 5° C. or more. Here, the controller 130 may compare the coil temperature with the cooling oil temperature in a period in which the coil temperature and the cooling oil temperature are linearly increased to ensure the reliability. For example, the controller 130 may compare the coil temperature with the cooling oil temperature from a period of 70° C. or more, which is the period in which the cooling oil temperature is linearly increased.

In addition, the controller 130 may compare the initial cooling oil temperature with the driving cooling oil temperature estimated by the calculator 120 to determine the period in which the coil temperature and the cooling oil temperature are linearly increased. The controller 130 may compare the coil temperature with the cooling oil temperature when a difference between the initial cooling oil temperature and the driving cooling oil temperature reaches a predetermined value. For example, the controller 130 may compare the coil temperature with the cooling oil temperature when the difference between the initial cooling oil temperature and the driving cooling oil temperature is 40° C. or more. Here, the controller 130 sets, as a reference, a case where the difference between the initial cooling oil temperature and the driving cooling oil temperature is 40° C. or more because this difference may be a reference for determining whether the cooling oil temperature reaches 70° C. or more, i.e., the period in which the cooling oil temperature is linearly increased. The controller 130 may set any of various reference values as long as the corresponding value is the reference for determining the period in which the cooling oil temperature is linearly increased.

In operation S340, the controller 130 may compare the current value D1 applied to the motor 200 with a reference current value D2. The controller 130 may pre-store the current value applied to the motor 200 when the coil temperature and cooling oil temperature of the motor 200 are normal and set the same as the reference current value D2. The controller 130 may determine that the coil temperature is abnormally high and perform operation S350 when a difference between the current value D1 applied to the motor 200 that is measured by the detector 110 and the pre-stored reference current value D2 is more than 5 [A].

The present disclosure can also be embodied as computer readable code or software stored on a computer-readable recording medium such as a non-transitory computer-readable recording medium. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc.

The controller 130 or calculator 120, or a combination thereof, may be implemented as a computer, a processor, or a microprocessor or may include a processor or a microprocessor. When the computer, the processor, or the microprocessor of the controller 130 and calculator 120 read and execute the computer readable code stored in the computer-readable recording medium, the controller 130 and calculator 120 may be configured to perform the above-described operations/method. In one example, the controller 130 and calculator 120 may include a storage or memory configured as a computer-readable recording medium storing the computer readable code or software.

As set forth above, according to the present disclosure, the motor cooling oil temperature may be estimated using the back electromotive force applied to the motor.

In addition, according to the present disclosure, there is no need for the sensor measuring the oil temperature as the motor cooling oil temperature is estimated to determine whether the abnormality occurs.

In addition, according to the present disclosure, there is no need for the sensor measuring the oil temperature, which may reduce the time and cost required for a production process.

In addition, according to the present disclosure, there is no need for the sensor measuring the oil temperature, which may save component costs.

In addition, according to the present disclosure, the motor may be cooled more efficiently based on the estimated oil temperature.

In addition, according to the present disclosure, the vehicle may have improved fuel efficiency by the efficient cooling.

Although the embodiments of the present disclosure are described as above, the embodiments disclosed in the present disclosure are provided not to limit the spirit of the present disclosure but to fully describe the present disclosure. Therefore, the spirit of the present disclosure may include not only each disclosed embodiment but also a combination of the disclosed embodiments. Further, the scope of the present disclosure is not limited to these embodiments. In addition, it is apparent to those skilled in the art to which the present disclosure pertains that a variety of variations and modifications could be made without departing from the spirit and scope of the present disclosure as defined by the appended claims, and all such appropriate variations and modifications should be considered as falling within the scope of the present disclosure as equivalents.

What is claimed is:

1. An oil temperature control device comprising:

a detector including a temperature sensor, and configured to detect state information, which includes a coil temperature of a motor, of a vehicle including the motor;

a calculator configured to estimate a cooling oil temperature of the motor based on the state information; and a controller configured to control an oil pump by comparing the detected coil temperature of the motor with the cooling oil temperature estimated by the calculator, and control a rotation speed of the oil pump based on a difference between the detected coil temperature and the cooling oil temperature.

2. The device of claim 1, wherein the calculator is configured to calculate a back electromotive force of the motor based on vehicle speed information included in the state information, and estimate the cooling oil temperature based on the back electromotive force.

3. The device of claim 2, wherein the calculator is configured to estimate an initial cooling oil temperature in a period from a stop state to an idle state of the vehicle based on the back electromotive force, and estimate a driving cooling oil temperature in a driving state period of the vehicle.

4. The device of claim 3, wherein the controller is configured to compare the detected coil temperature with the cooling oil temperature based on a difference between the initial cooling oil temperature and the driving cooling oil temperature.

5. The device of claim 3, wherein the controller is configured to compare the detected coil temperature with the cooling oil temperature when the driving cooling oil temperature reaches a predetermined temperature.

6. The device of claim 1, wherein the controller is configured to control the oil pump by comparing the detected coil temperature with the cooling oil temperature in a period in which the detected coil temperature and the cooling oil temperature are linearly increased.

7. The device of claim 1, wherein the controller is configured to control the oil pump based on a current value applied to the motor that is measured by the detector when the cooling oil temperature is less than a predetermined reference.

8. The device of claim 7, wherein the controller is configured to compare the current value applied to the motor that is measured by the detector with a pre-stored reference current value, and control the oil pump when a difference between the current value applied to the motor and the reference current value is more than a predetermined reference value.

9. A cooling oil temperature control method of a vehicle including a motor, the method comprising:

(a) receiving, by a controller, state information, which includes a coil temperature of the motor detected by a sensor, of the vehicle including the motor;

(b) receiving, by the controller, a cooling oil temperature estimated based on the state information; and (c) controlling, by the controller, an oil pump by comparing the detected coil temperature of the motor with the estimated cooling oil temperature and a rotation speed of the oil pump based on a difference between the detected coil temperature and the cooling oil temperature.

10. The method of claim 9, wherein in operation (c), the oil pump is controlled by the controller based on a current value applied to the motor that is included in the state information when the cooling oil temperature is less than a predetermined reference.

11. The method of claim 10, wherein operation (c) includes:

(c-1) comparing the current value applied to the motor that is included in the state information with a pre-stored reference current value, and (c-2) controlling the oil pump when a difference between the current value applied to the motor and the reference current value is more than a predetermined reference value.

* * * * *